US012161601B2

(12) United States Patent
Rodriguez-Cruz

(10) Patent No.: US 12,161,601 B2
(45) Date of Patent: Dec. 10, 2024

(54) WHEELETA

(71) Applicant: Angel Rodriguez-Cruz, The Villages, FL (US)

(72) Inventor: Angel Rodriguez-Cruz, The Villages, FL (US)

( * ) Notice: Subject to any disclaimer, the term of this patent is extended or adjusted under 35 U.S.C. 154(b) by 0 days.

(21) Appl. No.: 15/932,342

(22) Filed: Feb. 20, 2018

(65) Prior Publication Data

US 2019/0254917 A1 Aug. 22, 2019

(51) Int. Cl.

| | |
|---|---|
| ***A61G 5/02*** | (2006.01) |
| ***A61G 5/10*** | (2006.01) |
| ***A61G 5/12*** | (2006.01) |
| ***A61H 3/02*** | (2006.01) |
| ***A61H 3/04*** | (2006.01) |

(52) U.S. Cl.

CPC ................. *A61H 3/04* (2013.01); *A61G 5/02* (2013.01); *A61G 5/10* (2013.01); *A61G 5/128* (2016.11); *A61H 3/0288* (2013.01); *A61H 2201/1253* (2013.01)

(58) Field of Classification Search

CPC .................... A61H 3/04; A61H 3/0288; A61H 2201/1253; A61G 5/128; A61G 5/10

See application file for complete search history.

(56) References Cited

U.S. PATENT DOCUMENTS

| | | | |
|---|---|---|---|
| 2,236,089 A | 3/1941 | Ducavich | |
| 2,656,874 A | 10/1953 | Robb | |
| 2,774,605 A | 12/1956 | Schladebach | |
| 2,792,876 A | 5/1957 | Emary | |
| 2,798,533 A | 7/1957 | Frank | |
| 2,866,495 A | 12/1958 | Diehl et al. | |
| 2,896,693 A | 7/1959 | Schladebach | |
| RE24,817 E | 4/1960 | Hogan | |
| 3,338,627 A | 8/1967 | Frank | |
| 3,338,628 A | 8/1967 | Evans | |
| 3,354,893 A | 11/1967 | Schmerl | |
| 3,443,569 A | 5/1969 | Ernst | |
| 3,759,544 A * | 9/1973 | Korpela .................. | A61G 5/10 280/304.1 |
| 3,840,034 A | 10/1974 | Smith | |
| 3,854,774 A | 12/1974 | Limpach | |
| 4,073,537 A | 2/1978 | Hammersburg | |

(Continued)

*Primary Examiner* — Kevin Hurley
*Assistant Examiner* — Marlon A Arce

(57) ABSTRACT

Wheeleta comprises a regular wheelchair to which, the front area has been altered to adapt a pair of crutches. Wheeleta crutch assembly includes the wedges, a sheath, a spear and the handle with under arm cushion area and the bar. It will attach the handle to the spear by lifting the button and introducing the bar into the spear until the previously established height is reached. The button is liberated and the height is fixed. The wedge is attached to the end of the spear and kept in place by a pivot with an open end with a rotating metal blade. The crutches could be out of way by twisting the spear in its own sheath and utilized by the user when rises to go out or entering the chair. The crutches could be removed from the sheath by lifting and pushing the crutch. The wedges also, could be completely removed from the spear by twisting a rotating metal blade at the end of the crutch pivot. The crutch handle with bar could be removed out of the spear and used to reach objects.

11 Claims, 22 Drawing Sheets

(56) References Cited

U.S. PATENT DOCUMENTS

| | | | | |
|---|---|---|---|---|
| 4,099,277 | A * | 7/1978 | Watkins | A61G 7/005 280/250.1 |
| 4,162,101 | A | 7/1979 | McCague, Sr. et al. | |
| 4,223,944 | A | 9/1980 | DeLong | |
| 4,229,039 | A | 10/1980 | Day | |
| 4,239,248 | A | 12/1980 | Ewers | |
| 4,290,502 | A | 9/1981 | Anderson | |
| 4,300,742 | A | 11/1981 | Hunn | |
| 4,314,576 | A | 2/1982 | McGee | |
| 1,320,817 | A | 3/1982 | Knoke et al. | |
| 4,341,381 | A | 7/1982 | Norberg | |
| 4,373,756 | A | 2/1983 | Purdy | |
| 4,390,076 | A * | 6/1983 | Wier | A61G 5/14 180/11 |
| 4,415,049 | A | 11/1983 | Wereb | |
| 4,428,616 | A | 1/1984 | Hamilton | |
| 4,461,471 | A | 7/1984 | Brastow | |
| 4,500,102 | A | 2/1985 | Haury et al. | |
| 4,511,825 | A | 4/1985 | Klimo | |
| 4,526,419 | A | 7/1985 | Bowman | |
| 4,592,570 | A | 6/1986 | Nassiri | |
| 4,609,175 | A | 9/1986 | Conover | |
| 4,640,525 | A | 2/1987 | Jensen et al. | |
| 4,643,211 | A | 2/1987 | Morris | |
| 4,659,099 | A | 4/1987 | Malone | |
| 4,702,448 | A | 10/1987 | LoJacono et al. | |
| 4,721,321 | A | 1/1988 | Haury | |
| 4,730,869 | A | 3/1988 | Schumacher | |
| 4,753,482 | A | 6/1988 | Warren | |
| 4,779,884 | A | 10/1988 | Minati | |
| 4,829,285 | A | 5/1989 | Brand et al. | |
| 4,834,413 | A * | 5/1989 | Patel | A61G 5/10 280/250.1 |
| D301,976 | S | 7/1989 | Greenhut et al. | |
| 4,867,506 | A | 9/1989 | Chavez | |
| 4,878,685 | A | 11/1989 | Bahn | |
| 4,895,330 | A | 1/1990 | Anstead | |
| 5,022,476 | A | 6/1991 | Weege | |
| 5,026,114 | A | 6/1991 | Miller | |
| 5,035,467 | A | 7/1991 | Axelson et al. | |
| 5,060,967 | A | 10/1991 | Hulterstrum | |
| 5,086,391 | A | 2/1992 | Chambers | |
| 5,127,709 | A | 7/1992 | Rubinstein et al. | |
| 5,152,543 | A | 10/1992 | Sims et al. | |
| 5,180,181 | A | 1/1993 | Letechipia | |
| 5,209,509 | A | 5/1993 | Gay et al. | |
| 5,234,066 | A | 8/1993 | Ahsing | |
| 5,253,724 | A | 10/1993 | Prior | |
| 5,263,768 | A | 11/1993 | Scheulderman | |
| 5,299,824 | A | 4/1994 | Roberts | |
| 5,333,929 | A | 8/1994 | Slagerman | |
| 5,356,059 | A | 10/1994 | Yanez | |
| 5,364,162 | A | 11/1994 | Bar et al. | |
| 5,364,165 | A | 11/1994 | Okamoto | |
| 5,407,248 | A | 4/1995 | Jay et al. | |
| 5,456,437 | A | 10/1995 | Chander et al. | |
| 5,524,657 | A | 6/1996 | Jih | |
| 5,554,975 | A | 9/1996 | Hall et al. | |
| 5,588,663 | A | 12/1996 | Rundle et al. | |
| 5,590,893 | A | 1/1997 | Robinson et al. | |
| 5,597,148 | A | 1/1997 | Gospodarich | |
| 5,605,345 | A * | 2/1997 | Erfurth | A61G 5/08 135/67 |
| 5,607,202 | A | 3/1997 | Toso et al. | |
| 5,626,398 | A | 5/1997 | Wooldridge | |
| 5,662,123 | A | 9/1997 | Goldman | |
| 5,670,944 | A | 9/1997 | Myllymaki | |
| 5,678,798 | A | 10/1997 | Little | |
| 5,729,203 | A | 3/1998 | Oka et al. | |
| 5,848,824 | A | 12/1998 | Mocur | |
| 5,971,417 | A | 10/1999 | Swisshelm et al. | |
| 5,997,021 | A | 12/1999 | Robinson et al. | |
| 6,015,189 | A | 1/2000 | Broadhead et al. | |
| 6,027,132 | A | 2/2000 | Robinson et al. | |
| 6,095,611 | A | 8/2000 | Bar et al. | |
| 6,102,856 | A | 8/2000 | Groff et al. | |
| 6,142,350 | A | 11/2000 | Alexander | |
| 6,147,618 | A | 11/2000 | Halleck et al. | |
| 6,163,249 | A | 12/2000 | Betcher, III | |
| D437,679 | S | 2/2001 | Lisowski et al. | |
| 6,198,394 | B1 | 3/2001 | Jacobsen et al. | |
| 6,202,773 | B1 | 3/2001 | Rickey | |
| 6,227,511 | B1 | 5/2001 | De Costa | |
| 6,239,700 | B1 | 5/2001 | Hoffman et al. | |
| 6,264,218 | B1 | 7/2001 | Slagerman | |
| 6,264,225 | B1 | 7/2001 | Kunishige et al. | |
| 6,265,978 | B1 | 7/2001 | Atlas | |
| 6,311,999 | B1 | 11/2001 | Kueschall | |
| 6,333,694 | B2 | 12/2001 | Pierce et al. | |
| 6,349,201 | B1 | 2/2002 | Ford | |
| 6,433,690 | B2 | 8/2002 | Petelenz et al. | |
| 6,496,111 | B1 | 12/2002 | Hosack | |
| 6,547,112 | B2 | 4/2003 | Gallagher et al. | |
| 6,565,053 | B1 | 5/2003 | Larky | |
| 6,651,946 | B1 | 11/2003 | Thornton | |
| 6,659,563 | B2 | 12/2003 | Float et al. | |
| 6,733,074 | B2 | 5/2004 | Groth | |
| 6,774,795 | B2 | 8/2004 | Eshelman et al. | |
| 7,192,042 | B2 | 3/2007 | Cerreto | |
| 7,980,572 | B2 | 7/2011 | Bennett | |
| 8,328,215 | B2 | 12/2012 | Knopf | |
| 10,130,530 | B2 * | 11/2018 | Golden, Jr. | A61G 5/024 |
| 2002/0134808 | A1 * | 9/2002 | Gallagher | B60R 11/00 224/553 |
| 2010/0237586 | A1 * | 9/2010 | Dougherty | A61G 5/06 280/304.1 |
| 2013/0324379 | A1 * | 12/2013 | Zondervan | A63B 21/04 482/130 |
| 2014/0261587 | A1 * | 9/2014 | Price | A61H 3/00 135/65 |
| 2015/0283009 | A1 * | 10/2015 | Borisoff | A61G 5/14 602/16 |
| 2016/0058648 | A1 * | 3/2016 | Soulakis | A61H 3/02 135/68 |
| 2017/0042753 | A1 * | 2/2017 | Frankian | A63B 21/4011 |
| 2024/0175268 | A1 * | 5/2024 | Hoffberg | A61G 5/10 |

* cited by examiner

2C

2B

2D

2A

5B

5A

6C

6B

6D

6A

8B

8D

9B

10C

10B

11C

11E

11B

11A

12B

WHEELETA

BACKGROUND OF THE INVENTION

Crutches with immediate access contribute to the wellness of those confined to a wheelchair. The WHEELETA is a wheelchair with muletas or crutches. It is created with the idea of providing to those handicapped persons with a tool that improve the way they move. The chair could go to a limit space or area and the crutches are there whenever they need it. They rest their feet on the wedges, while using the chair, but at the time of walking, they pull up the crutch, adjust the height, move the grip handle from the upper hole to that one that fix the height. Now the grip is facing the same way the wedge. Then, the crutches are switchable. The one to the left go to the right and vice-versa. The wedge and the grip are out of way, so the liberty of movement is better. Under the wedges are four canals that should make traveling more comfortable, reducing impact and preventing slippage. To remove the mango from the crutch, pull the knob and the stick is free to go, inclusively out of the shell and store aside. The bar will help in case of getting something out of reach. Will be of significant help when no family or health care provider is close.

Different sizes of wedges could be tempered to the obstacles inside the house, allowing the patient to move freely from one side to the other.

FIELD OF THE INVENTION

The invention relates to the need of a disable person to have the crutches close enough for immediate access without exiting the wheelchair, or the requirement of another person. Crutches with immediate access contribute to the wellness of those confined to a wheelchair. Crutches can be adjusted to different measures. Can be used to reach, push or help when getting off the wheelchair. Even as an instrument of defense.

BRIEF DESCRIPTION OF THE DRAWING

The embodiment of the alteration in the front area of a wheelchair will be Illustrated by drawings. The crutch adapted comprises the handle with bar, the grip, the shell and the wedge. Also the sheath to carry the crutch.

Page 1, FIG. 1 Is a perspective view of a wheelchair with a pair of wedges fixed to crutches. The sheaths adhered to the chassis or structure by fixed support (FIG. 1*c* and FIG. 1*d*) are for carrying the crutches. Those could be liberated by simply lift it out of top yoke 2*a* and push to the front.

Figure 1:
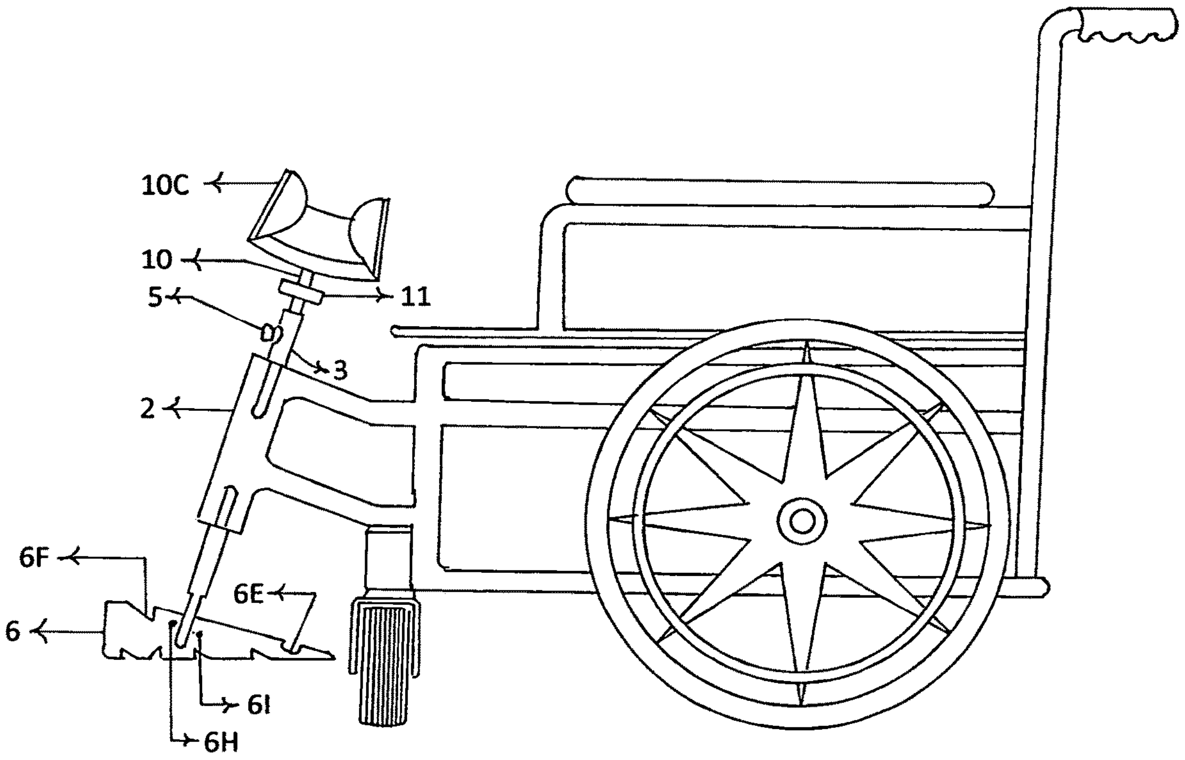
Figure 2:
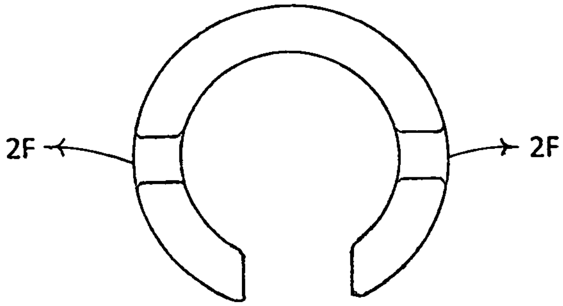
Figure 2:
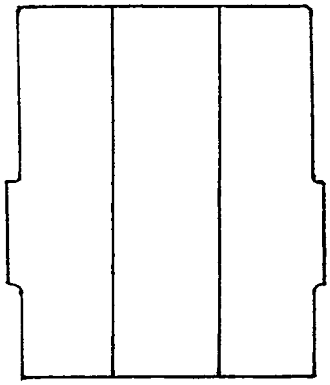
Figure 2:
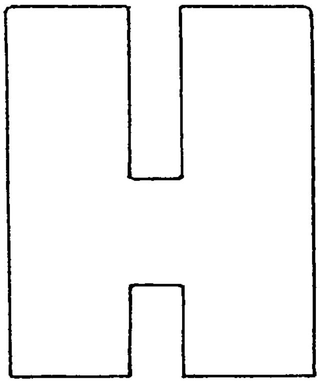
Figure 2:
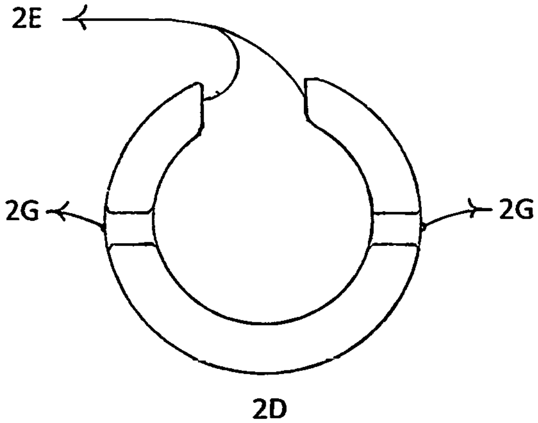
Figure 2:
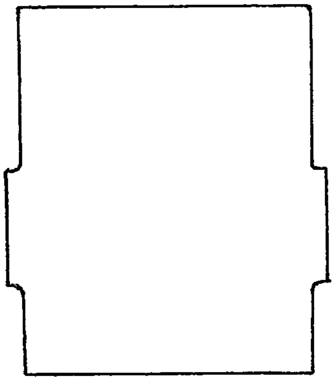

Page 2, FIG. 2 Is a section view of the sheath. It comprise FIG. 2*a* rear view, FIG. 2*b*, side view FIG. 2*c* top view and FIG. 2*d* bottom view FIG. 2*e* upper yoke, FIG. 2*f* lower yoke. The sheath is the house of the shell FIG. 3. The sheath allows the crutch to be free when ever needed. The shell is fixed to the sheath when the wings FIG. 3*d* of the shell couple with the top yoke of the sheath.

Figure 3:
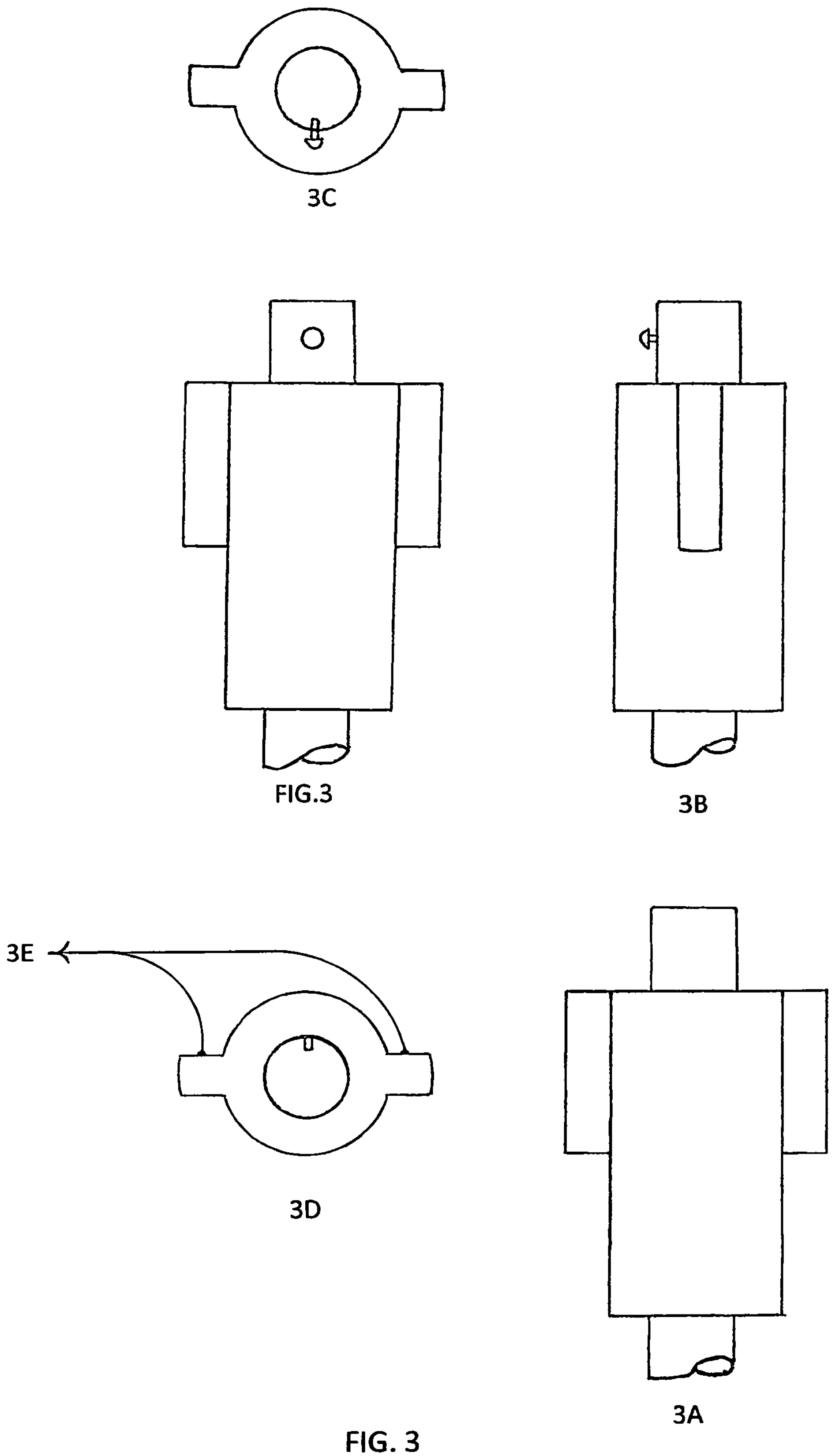

Page 3, FIG. 3 Is a section view of the shell. FIG. 3*a*. FIG. 3*b*, FIG. 3*c* are respectively front, rear side and top view. FIG. 3*d* Is a top view of the wings of the shell.

Figure 4:
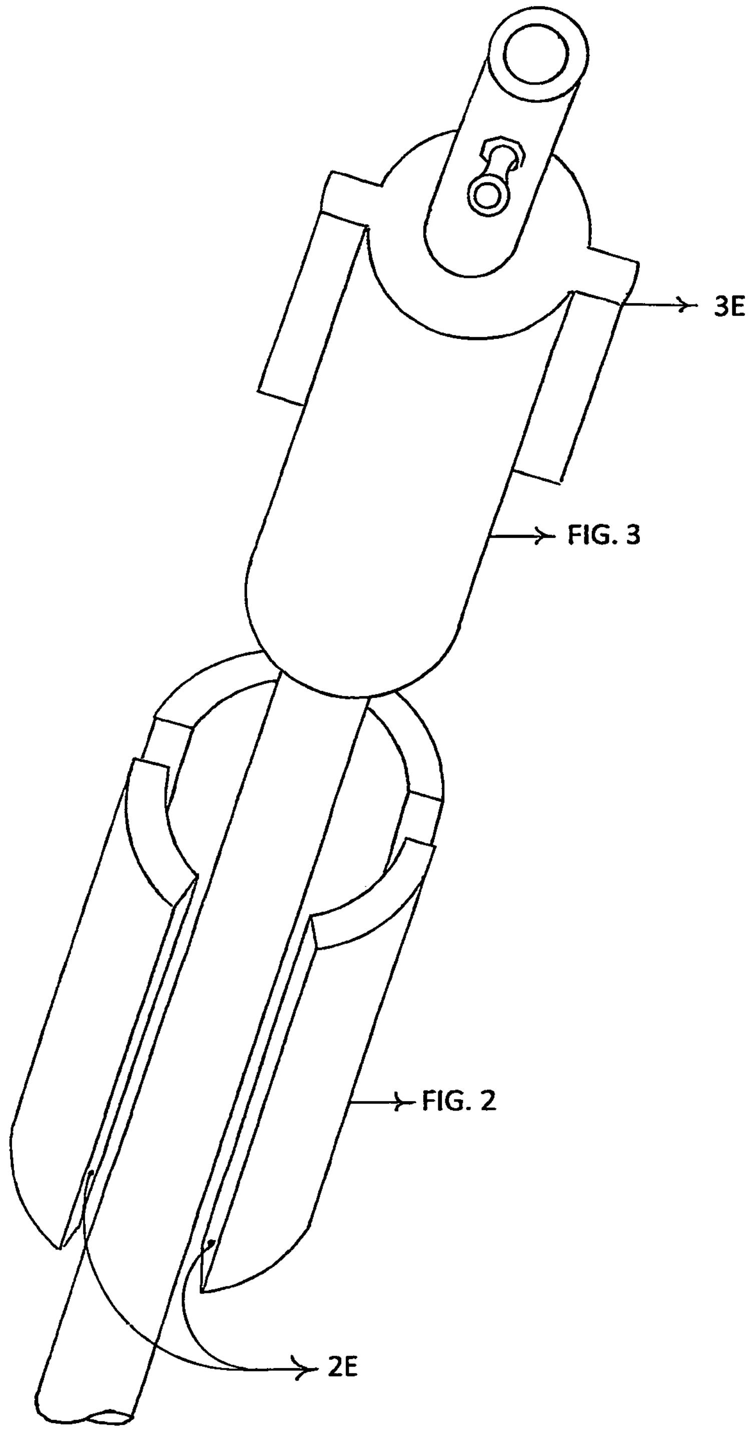

Page 4, FIG. 4 Is a front view of the knob. FIG. 4*a* and FIG. 4*b* are respectively rear and side views of the knob used to fix the adequate height of the crutch.

Figure 5:
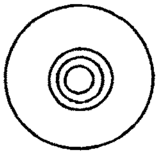
Figure 5:
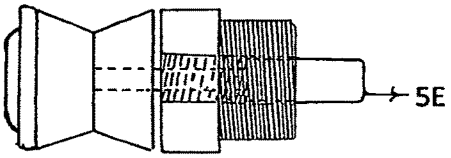
Figure 5:
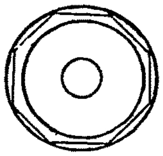

Page 5, FIG. 5 Is a plan view of the wedge footrest. FIG. 5*a* Is a side view of a slightly modified wedge. There are four groves 5*i* under the wedge to prevent slippage.

FIG. 5*h* Is a hollow or groove used to hook, between other things, handles of door. By inserting the wedge between the door and the handle of the lock to the trench and then twisting, the door could be pulled or pushed open.

FIG. 5*c* and FIG. 5*d* are holes with thread. Those are the docks of FIG. 5*f* and FIG. 5*g*. FIG. 5*e* is the hole for crutches spike.

Figure 6:
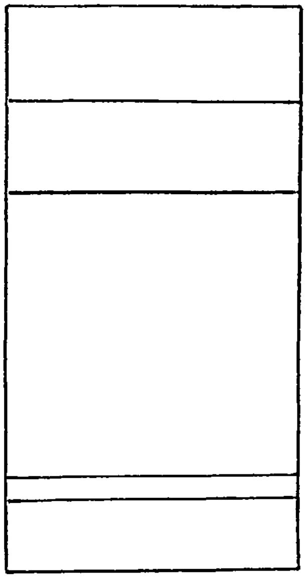
Figure 6:
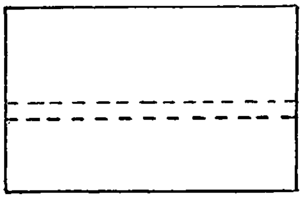
Figure 6:
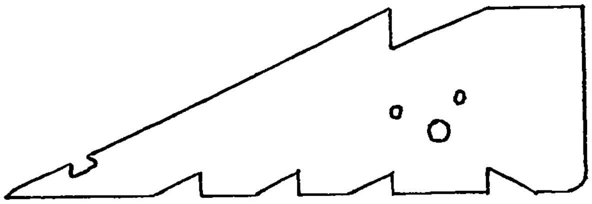
Figure 6:
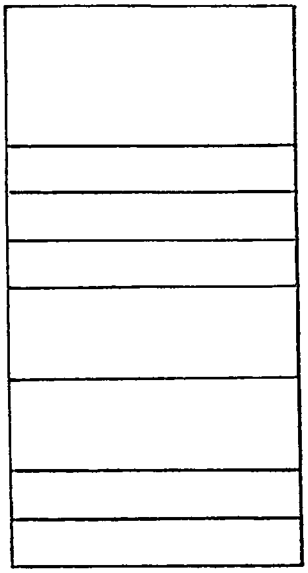
Figure 6:
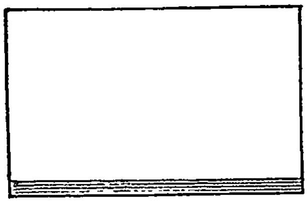

Page 6, FIG. 6 Is a perspective view of the shell without the handle and the wedge.

FIG. 6*a* Is a side section view of the system to keep the wedge in place. It consists of a flip piece of metal crossed to avoid the wedge to fall off.

FIG. 6*b* Is a section view of the area where the flip piece of metal is hidden to avoid the wedge to fall of. It demonstrates the easy way to take off the wedge.

FIG. 3*d* Is a front view of the wings of the shell engaging the top yoke FIG. 2*e* and bottom yoke FIG. 2*f* of the sheath to keep the crutch in place.

FIG. 6*c* Is a perspective side view of the shell. The anchor pin where the wedge pivot limited by the two studs and the piece of sheet welded to the shell.

FIG. 6*d* Is a section view of the piece of metal welded to the shell.

Page 6, FIG. 6*e* Is an elevation bottom view of the area where the wedge is installed.

FIG. 3*d* is a front view of the wings to keep the crutch in place.

Figure 7:
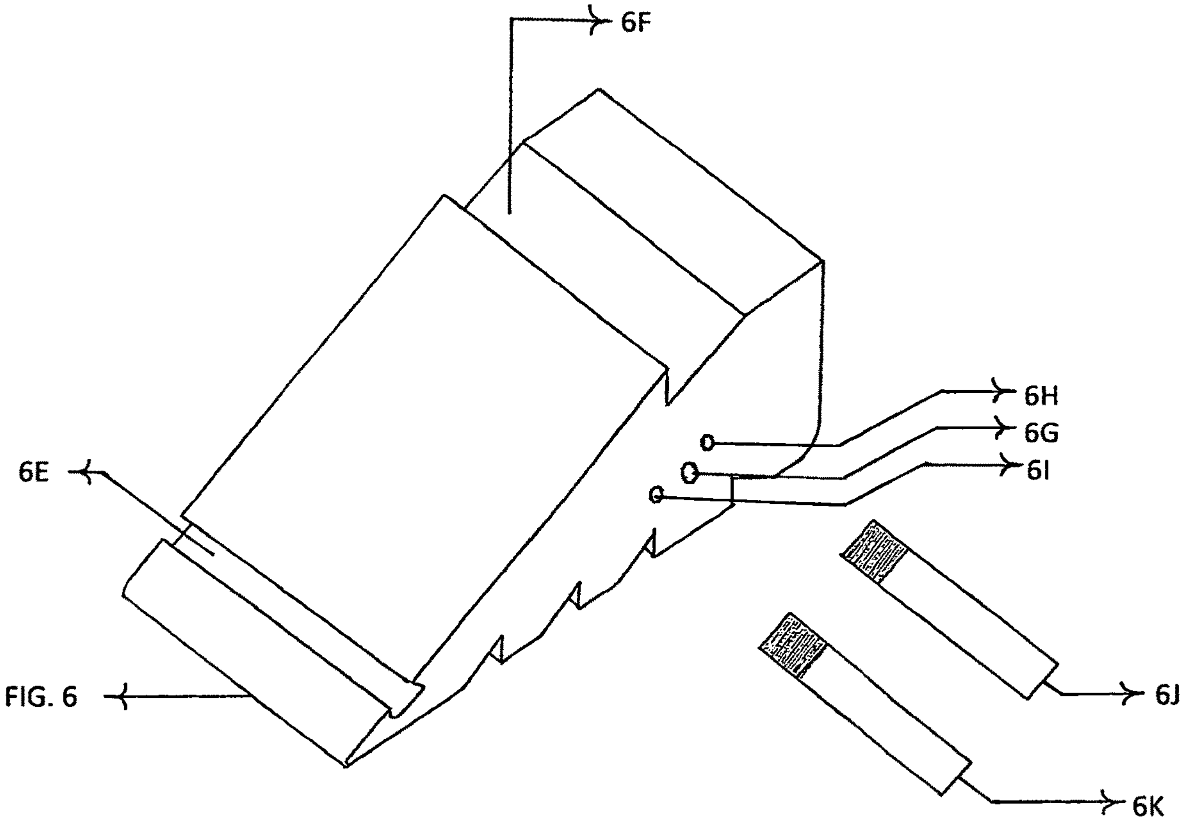

Page 7, FIG. 7 Is a section view of the crutch with the wedge installed and secure with the flip piece of metal FIG. 7*b*.

FIG. 7*a* Is a perspective side view of the wedge. Both figures try to demonstrate that the pivoting of the wedge is limited by the piece of metal and the two studs.

Figure 8:
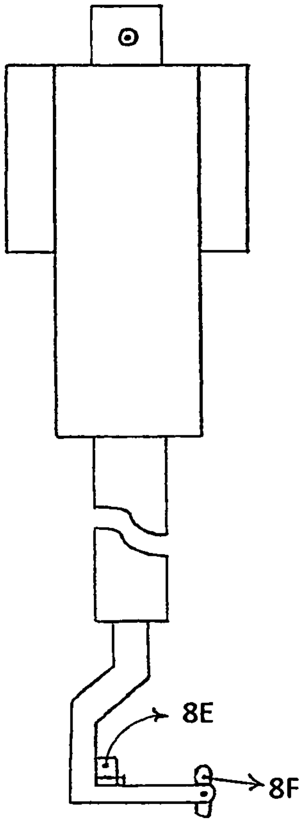
Figure 8:
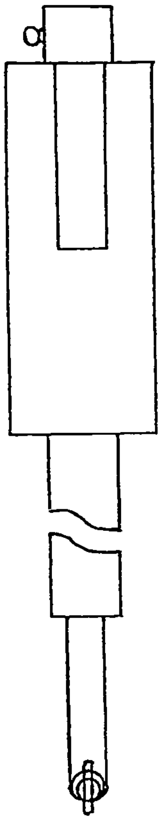
Figure 8:
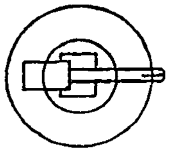

Page 8, FIG. 8 Is a perspective view of the cushion handle with bar. FIG. 8*e* Is a perspective view of the holes going through the bar for the installation of the hand grip. FIG. 8*f* Is the perspective view of the holes observed for the small pin of the knob to adjust the adequate height.

FIG. 8*a* Is a side plan view of the crutch. The other side is a mirror view.

FIG. 8*b* Is a perspective view of the top of the handle. Is a very cushion area that try to distribute the weight through a bigger area.

FIG. 8*c* Is a plan view of the hanger utilized when shopping or traveling. Used to hang purses, handbag or shopping bags.

FIG. 8*d* Is a plan view of the hanger utilized to reach specifically design cups or glasses. Remembering that the handle could be removed very easy from the crutch.

Figure 9:
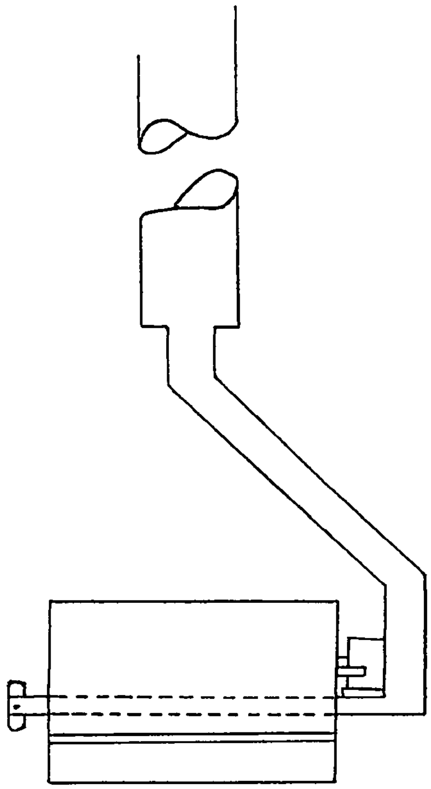
Figure 9:
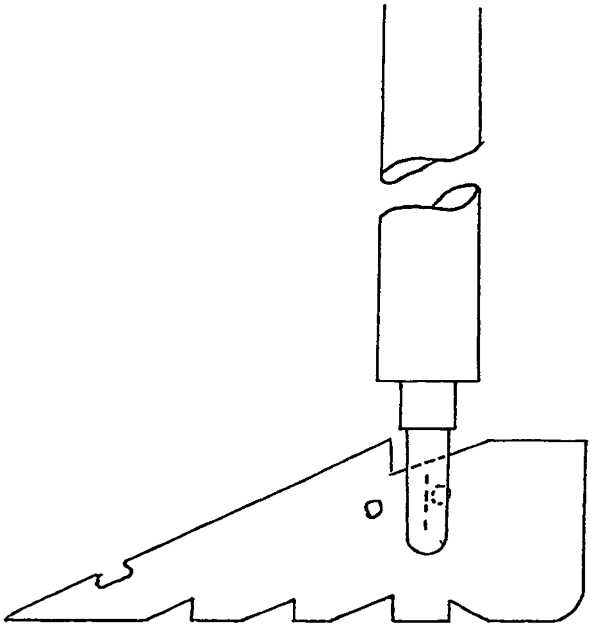

Page 9, FIG. 9 Is a front elevational view of the hand grip for the crutch handle. FIG. 9*d* is the wing nut for the handle screw FIG. 9*a*, FIG. 9*b* and FIG. 9*c* are respectively rear, side and top views of the grip.

Figure 10:
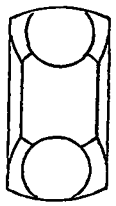
Figure 10:
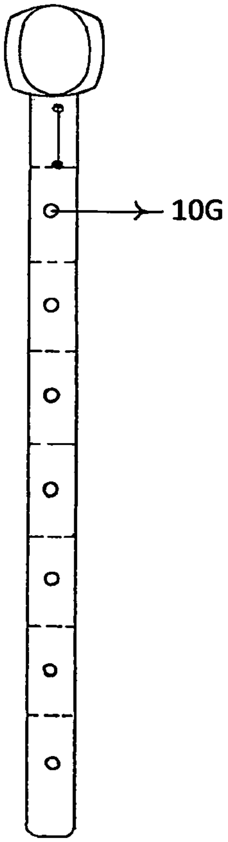
Figure 10:
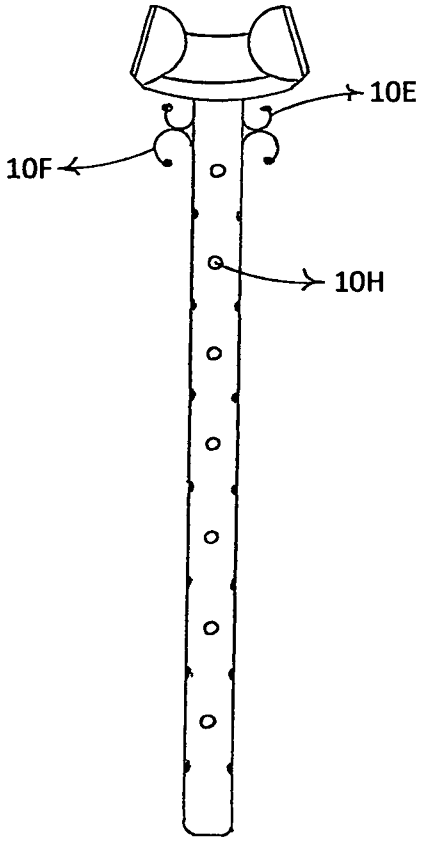

Page 10, FIG. 10 Is a perspective view of the whole crutch. It consists of the shell, FIG. 3, the footrest FIG. 5, the handle FIG. 8*b*, with bar FIG. 8 and the hand grip FIG. 9.

FIG. 10*a* Is a side perspective view of the crutch. The footrest pivotally supported limited by the two studs. Also, the knob FIG. 4, to fix the appropriate height of the crutch.

FIG. 9*d* Is a perspective view of the wing nut to hold the hand grip

Figure 11:
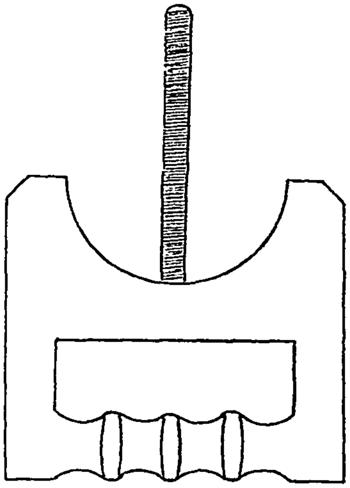
Figure 11:
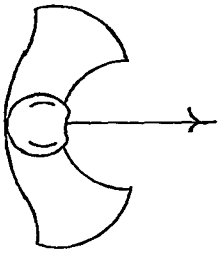
Figure 11:
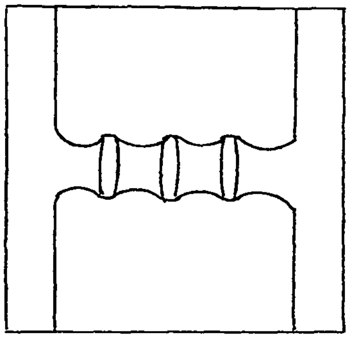
Figure 11:
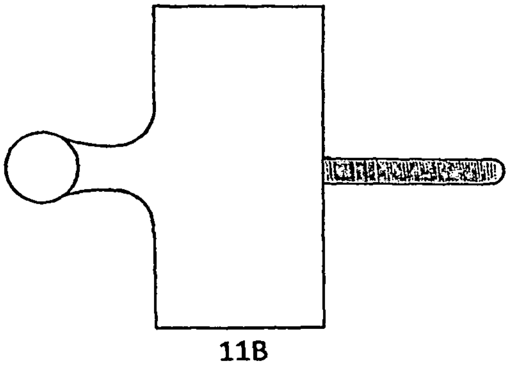
Figure 11:
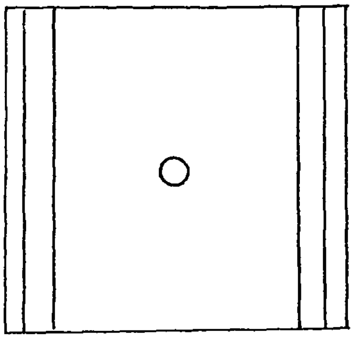

Page 11, FIG. 11 Is a perspective view of the embodiment of the shell FIG. 3, entering the sheath Fig. F2.

FIG. 3*d*, the wings of the shell fitting the top yoke FIG. 2*e*, to keep the crutch in place. The shell could be twisted to move the footrest to the side FIG. 11*a*.

Figure 12:
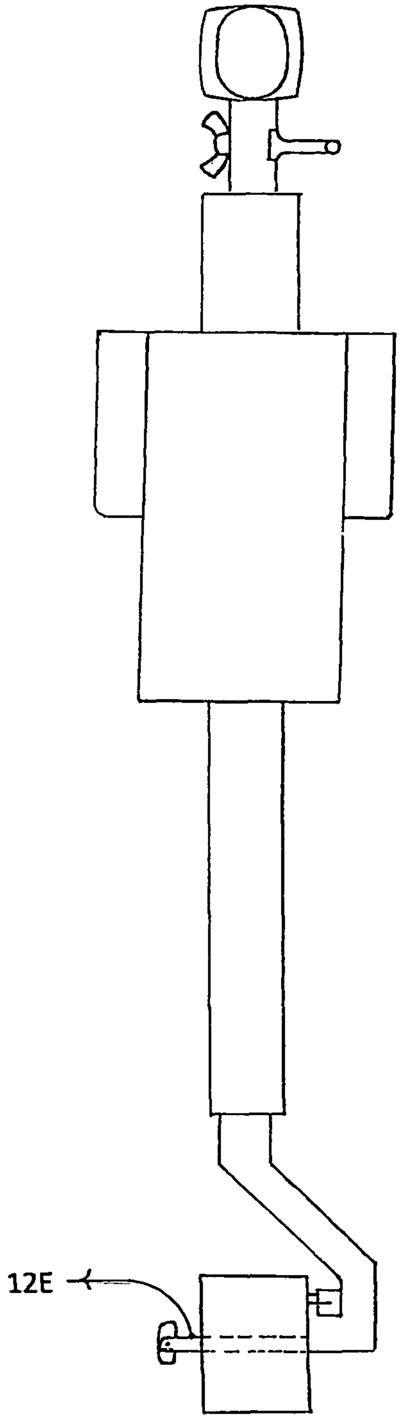
Figure 12:
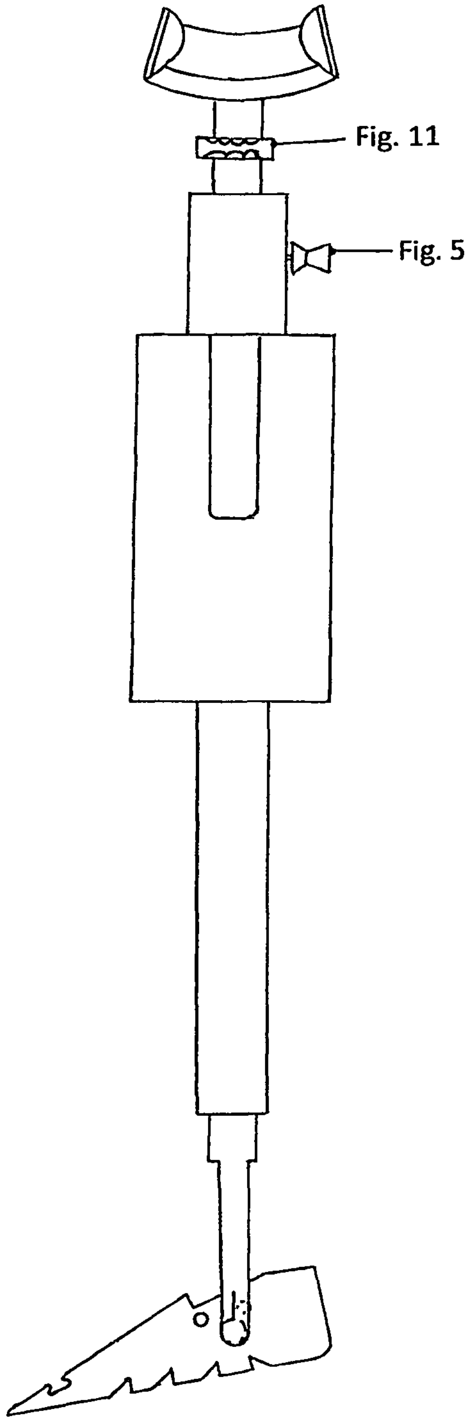
Figure 13:
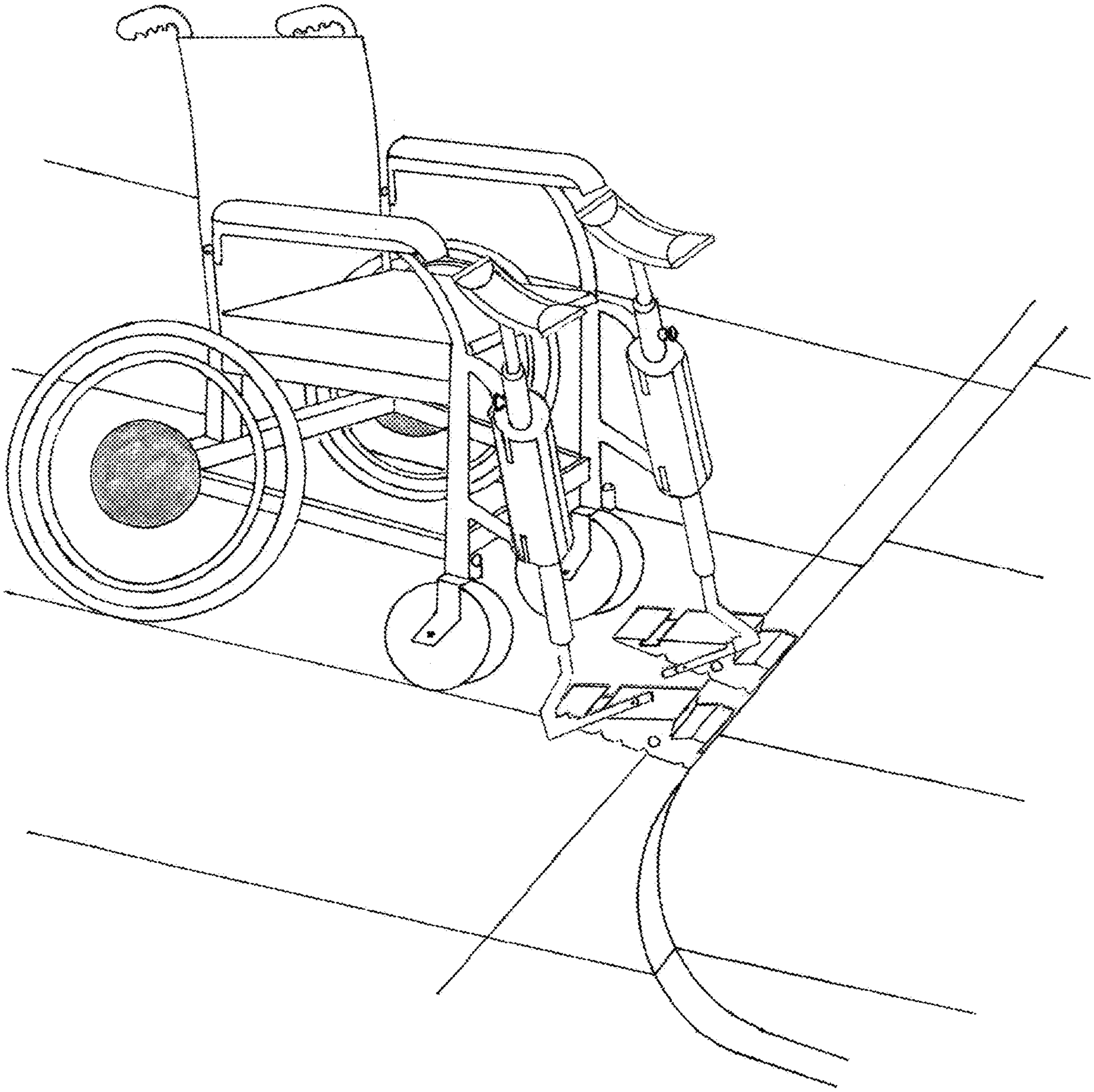
Figure 14:
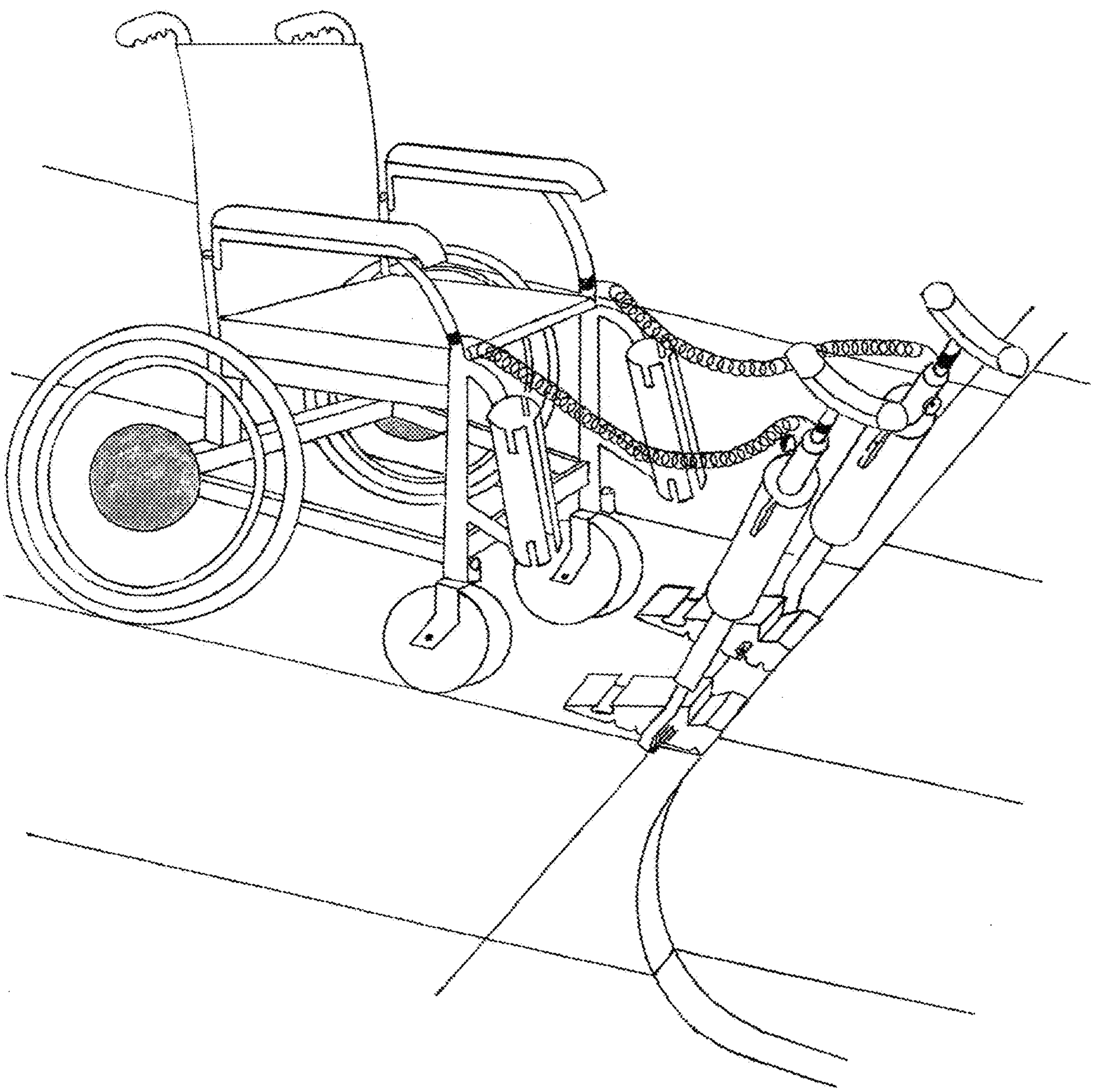
Figure 15:
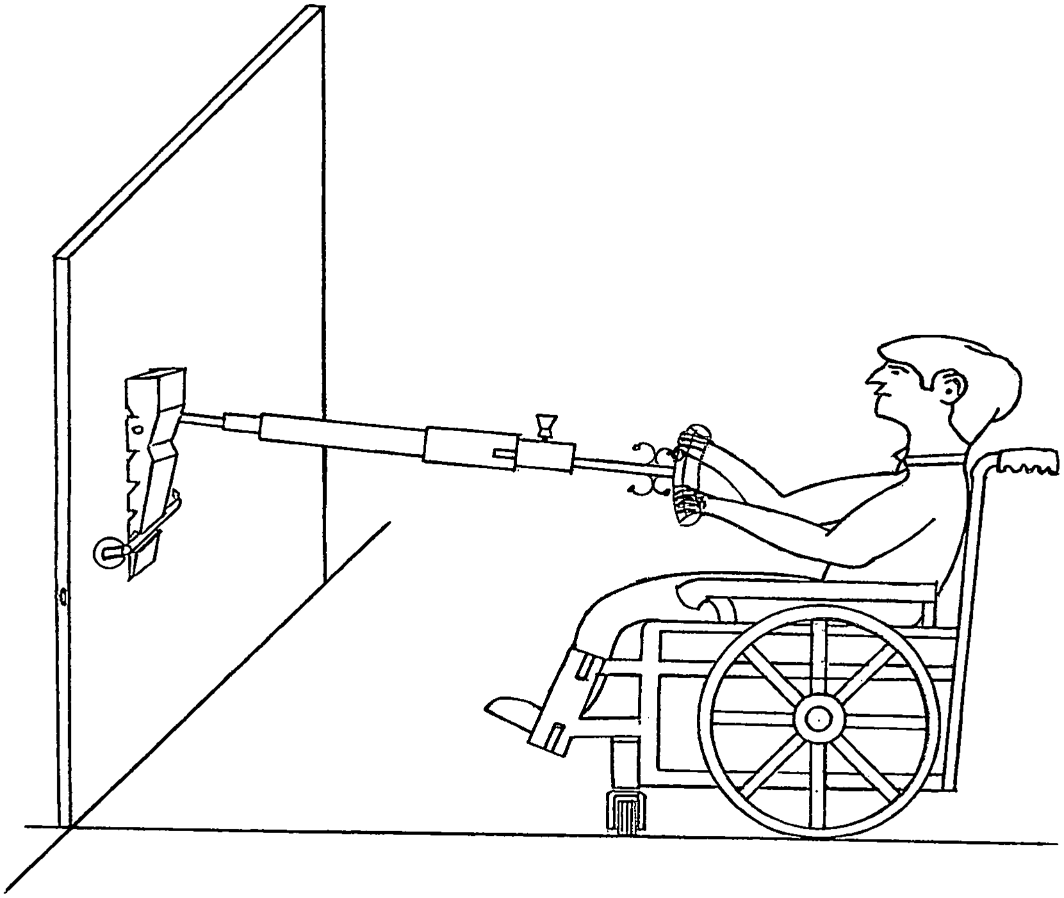
Figure 16:
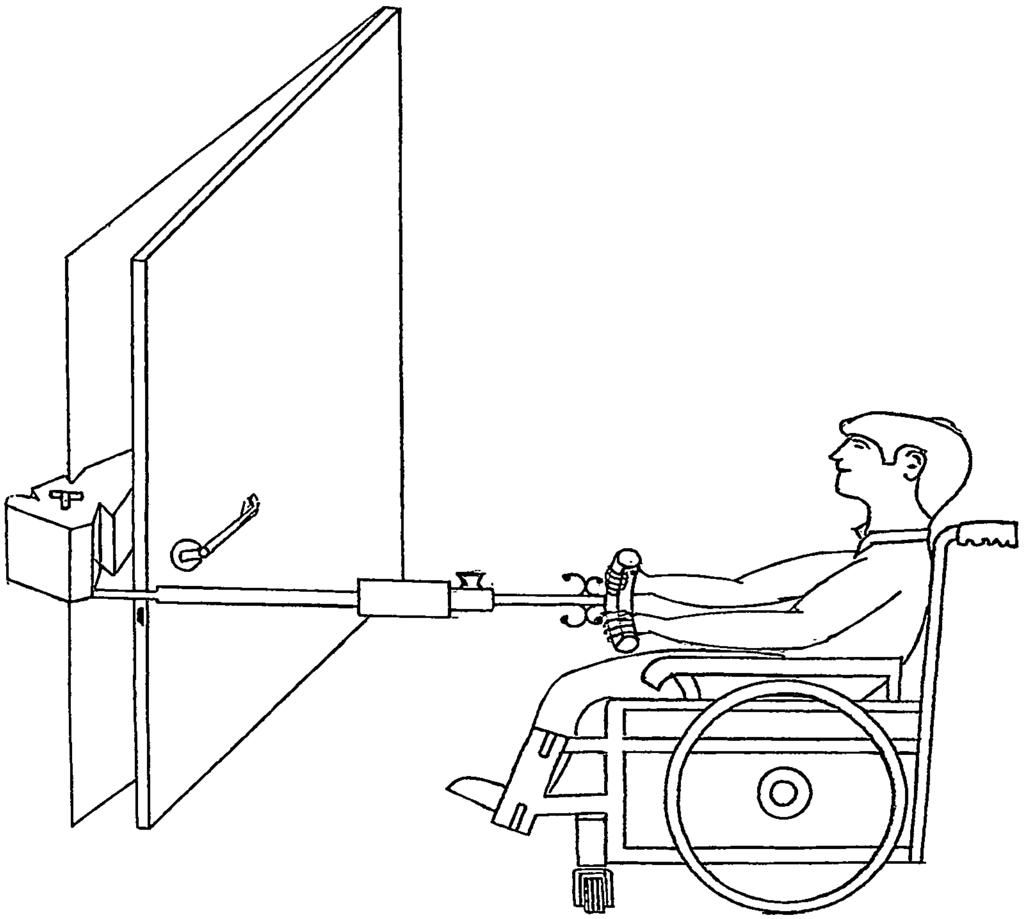
Figure 17:
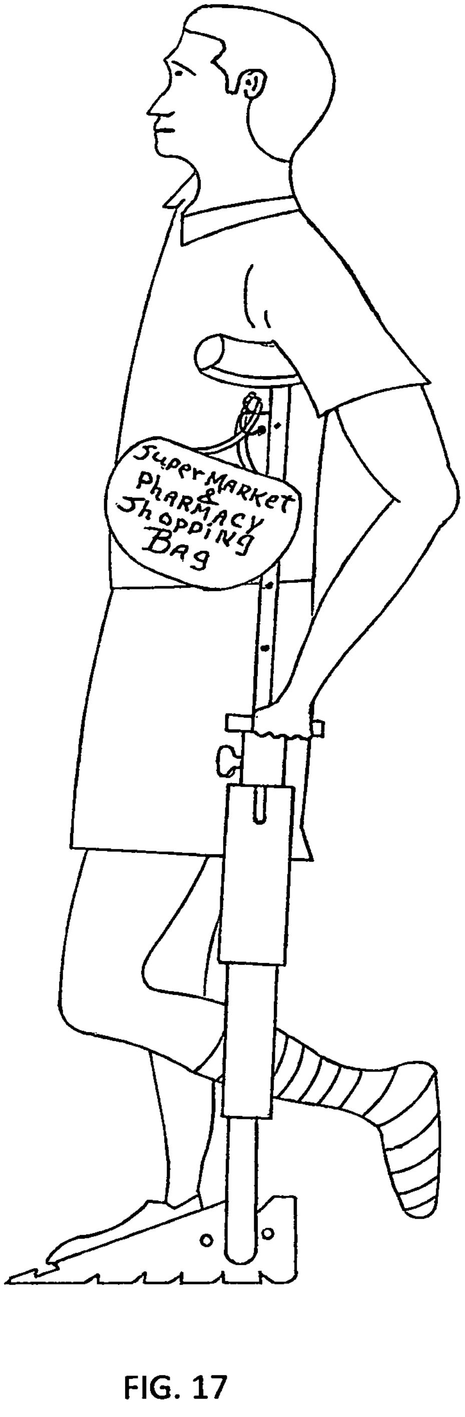
Figure 18:
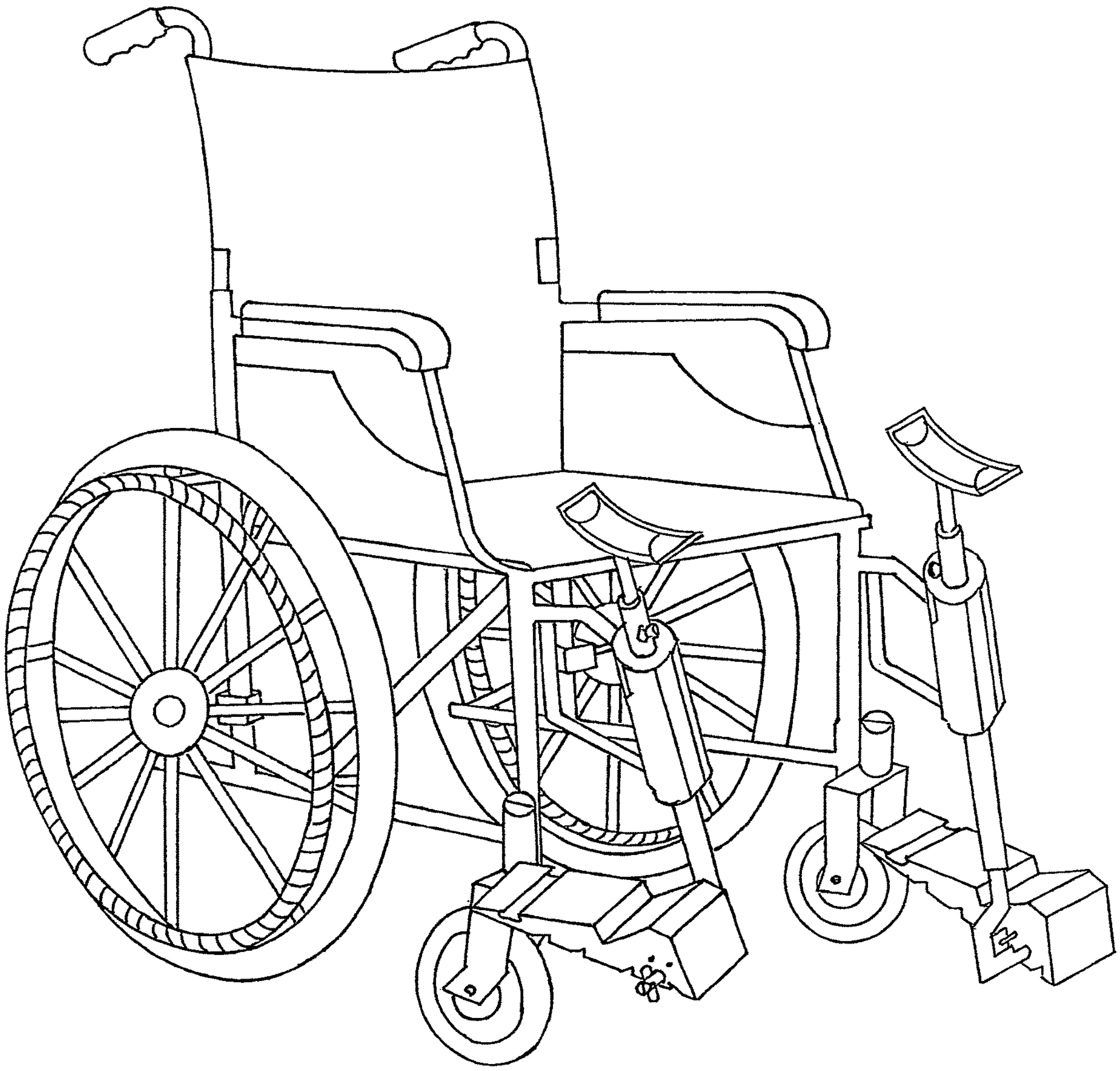
Figure 19:
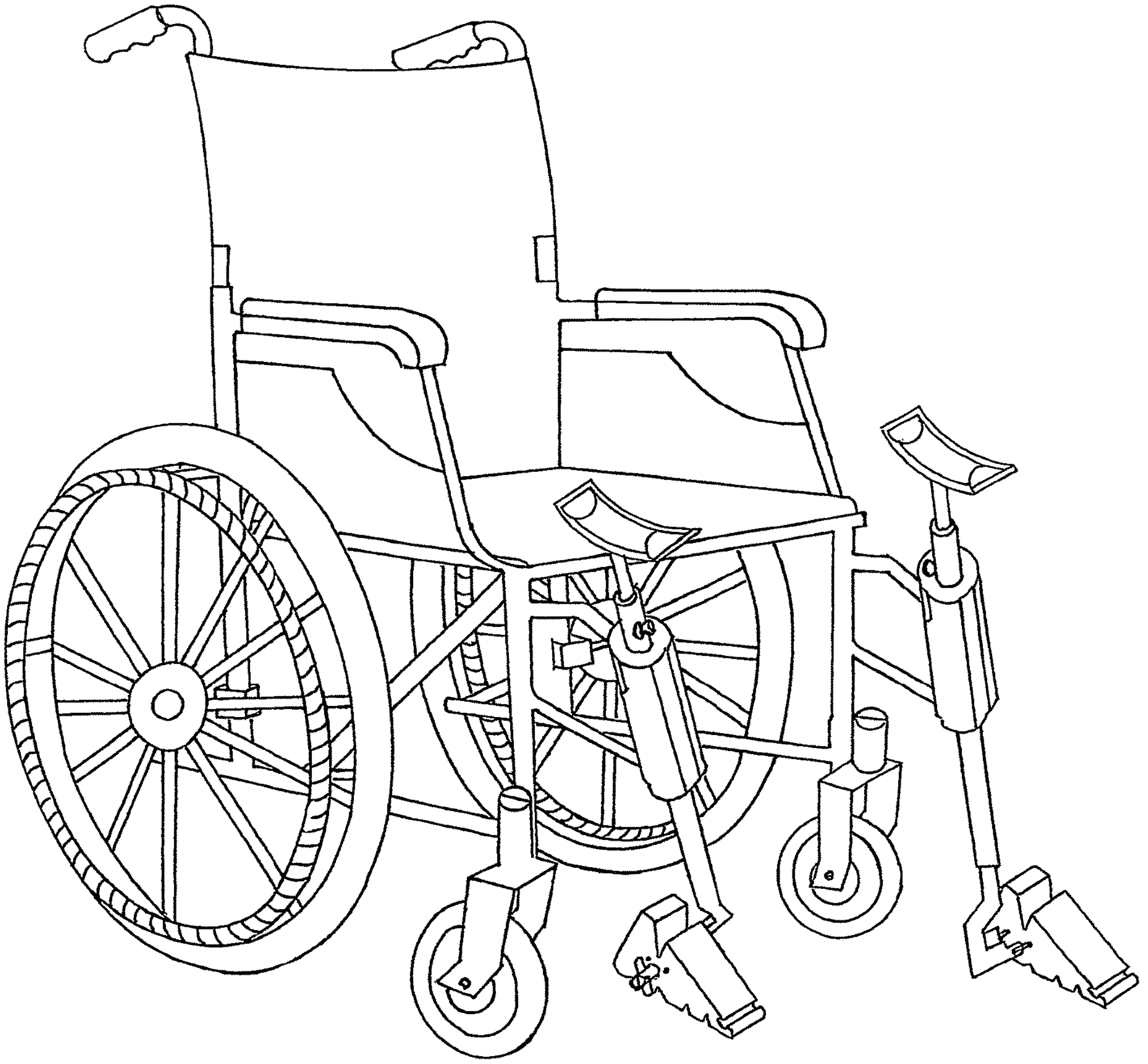
Figure 20:
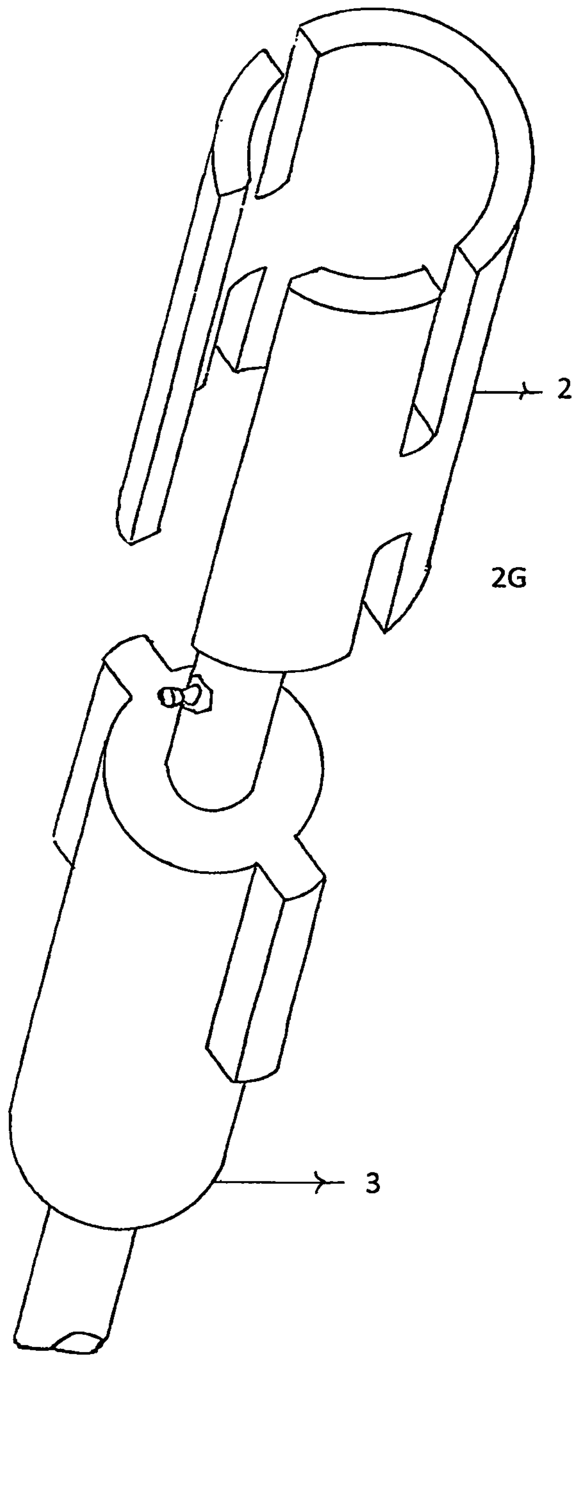
Figure 21:
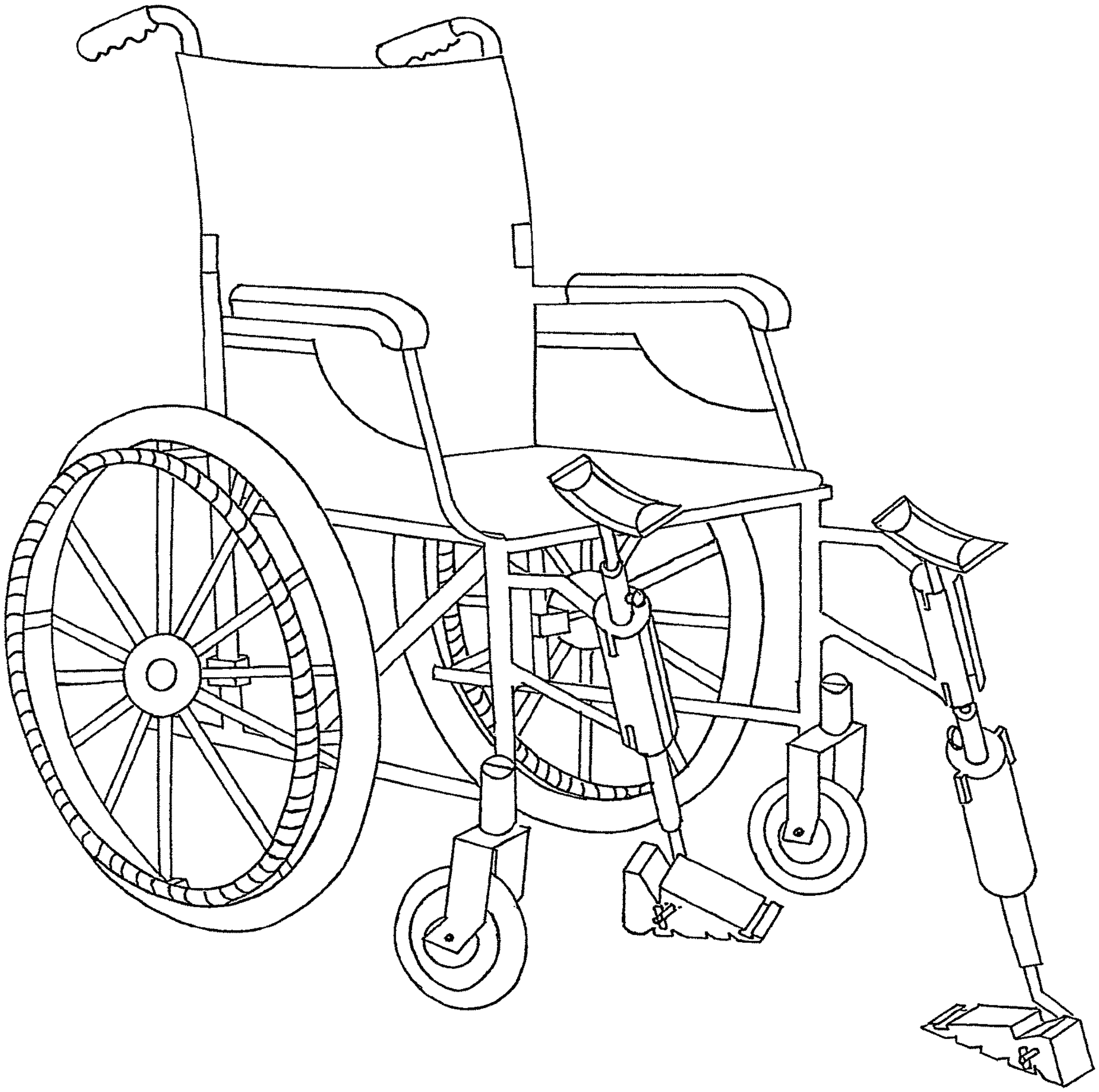
Figure 22:
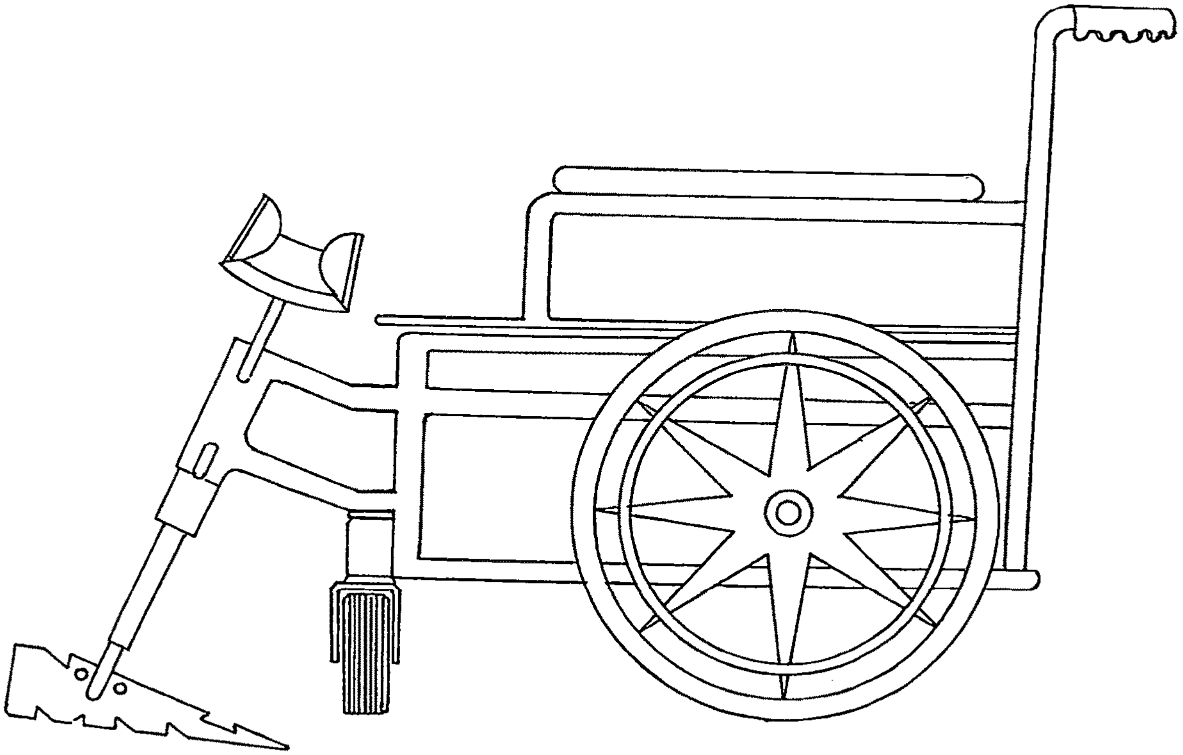

Page 12, FIG. 12 Is a perspective view of parts of the crutch including the shell FIG. 3, the upper yoke FIG. 2*e*, and the sheath FIG. 2. The shell inversely (bottom up) attached FIG. 12. This movement create more stability to the wheelchair, limiting the movement, FIG. 12*a*. Both from wheelchair are elevated.

DETAILED DESCRIPTION OF THE INVENTION

Wheeleta is a combination of wheelchair and crutches with wedges 1, is an embodiment to be attached to a front area of a wheelchair, having as purpose, improvement of an easy movement of a person with limitations. The accessories consist of a sheath 2, attached to the front of the wheelchair. The shell 3, goes coupled inside the sheath 2, docked and secure by two wings 3*d* inside two small ditches on the sheath 2*e*, but allowing the shell to be released easily, by lifting and pushing out of sheath through the groove 2*c*. The footrest of the crutch is the wedge 5*a*. It comprises a groove 5*h*, a step for a second impulse to the side walk 5*b*, two small holes 5*c* and 5*d* with thread, a bigger hole 5*e* and two bolts 5*f* and 5*g*. The wedge could be used as a ramp to overcome obstacles. It is by lifting the crutch 10 out of the sheath 2 putting the handle completely inside the shell, turning a small metal sheet 7*b* that holds a wedge in place, unlocking the wedge and placing both wedges against the sidewalk, in front of the wheels.

These could be recovered with the same crutch after achieving the goal. Other way to use a wedge to overtake obstacles is by lifting the crutch 10, out of the sheath 2, pushing the handle completely inside the shell and place the wedge with crutch on the floor in front of the wheels, against the sidewalk. The crutches should be attached to the wheelchair by a coil cord from the handle of the crutch to the upper tube 1*a* closer to the seat.

The groove 5*h*, in the wedge was created to help disabled persons to open doors by Introducing the narrow end of the wedge between the handle and the door to the groove, and pulling by hand or by hooking the armrest in wheelchair tube close to the lap 1*a* and move back. The groove also could dock the handle of some doors lock, twist it and push or pull to open. Those swinging doors could be pushed with the rubber under the wedge to be opened. In some cases the other crutch should be used to help. Those two holes with threads 5*c* and 5*d*, host two studs FIG. 5*f*, 5*g* to limit the pivoting movement of the wedge. A piece of metal sheet 6*d*, welded to the crutch end, will be between the two studs. The bigger hole FIG. 5*e*, in the wedge is for the pivoting spike 6 and 7.

The crutch handle 8*b*, has a cushion area with memory foam trying to distribute evenly the body weight. The small and shallow holes 8*f*, are used to establish appropriate height fixed by the knob 4. The side view of the crutch 8*e*, shows the bigger holes to fix the grip 9. The small hook 8*c*, under the crutch cushion handle is
necessary when shopping to hang up, shopping bag, purses or hand bags, allowing to free both hands for displacement. The hook 8*d*, could be used to carry certain cups or
glasses cone shape when sitting at a table or reaching the salt at the other end. The handle should be out of the shell. The grip 9, fixed at horizontal position for easy grip will be fixed at the other side with a wingnut. 9*d*.

The whole crutch 10 and 10*a* out of the sheath demonstrates how the wedge is fixed to the pivot 6 and 7 at the end of the shell. The handle is inside the shell 10 and 10*a*. The shape of both crutches are the same. Each crutch could be twisted in the sheath of the same side 11*a*, putting aside the wedge, liberating the exit of wheelchair or could be swap with the other at the other side. Using the higher side of the wedge to the back, will create a torque to the front for ease walk. Other kind of wedge could be used to walk up stair. A small one to adapt better to the step size. Small pockets under seat with same material could be built, so when the chair is closed, both pockets are at opposite side under the seat canvas.

A wheelchair is the most important instrument for a disable person. It should be there in an emergency situation. If a disabled person falls to the ground, close to the wheelchair, could lift the crutch, move it from an upper part and insert it from downward 12 allowing more stability to the chair when he or she is trying to go back to the seat. It could be done with a crutch of one side. If more stability is needed, both wedges could be removed and both crutches could be placed by downward, acquiring more stability of the wheelchair. If the crutch with wedge is used to stabilize the chair the crutch could be released by using the other crutch or by turning the small sheet of metal holding in place the wedge. To achieve this from the wheelchair a handle bar can be used. When doing this both pivots should be looking the same way to facilitate the release or restitution of the wedges. A disabled person alone holding the bars of the wheelchair 1*d* and 1*c* could get back in a seat. By pulling the left wheel rim from the front and pulling the right wheel rim from the back, that twist to a wheelchair will release both wedges. Obviously, both pivots have to be facing the same way, to the right.

If both crutches with wedges are used to stabilize the wheelchair inserting those downward, the front wheel of the chair could be elevated. It is important to prevent the disabled person from been able to move at will.

It is understood that the present invention described herein is for purposes of illustration only and that changes and modification may be made there to without departing from the spirit and scope of the invention. The description taken with the drawings making apparent to those skilled in the art how the several forms of the invention may be embodied in practice. Some others illustrative drawings were sent on Nov. 13, 2019.

What is claimed is:

1. A wheelchair crutch assembly comprising:
- a wheelchair;
- two crutches;
- two shells, each shell configured to selectively attach and detach from a respective one of the crutches;
- two sheaths, each sheath configured to removably hold a respective one of the two shells;
- at least one fixed support bar connecting each sheath to a respective front portion of the wheelchair;
- two wedges, each wedge configured to receive an end portion of a respective one of the two shells,
- wherein each wedge is configured to be selectively positioned against a curb and configured to be used as a ramp for the wheelchair.

2. The wheelchair crutch assembly according to the claim 1, wherein each sheath is configured to position a respective one of the two crutches within reach of a user of the wheelchair and configured to help the user get out of the wheelchair.

3. The wheelchair crutch assembly according to claim 1, wherein each crutch includes a handle extending away from crutch.

4. The wheelchair crutch assembly according to claim 1, wherein each shell includes a knob configured to detach a respective one of the two support pad with bar from a respective one of the two shells.

5. A wheelchair crutch assembly according to claim 1, wherein each wedge includes a groove used to hook handles of doors, by inserting the wedge between the door and the handle of the lock to the groove and twisting, the door is configured to be pulled or pushed open.

6. A wheelchair crutch assembly, according to claim 1, wherein the hooks under the auxiliary support pads are used when shopping or traveling, while both hands are free and available.

7. A wheelchair crutch assembly according to claim 1, wherein the chair is configured to be restrained by introducing the shell bottom up the sheath, the crutch touching the floor avoid the movement of the wheelchair creating more stability while the disabled person alone on the floor, is trying to get back to the seat holding the tubing of the same side restrained.

8. The wheelchair crutch assembly according to claim 7, wherein both wedges are configured to touch the floor when traveling in public transit to override chair movement.

9. The wheelchair crutch assembly according to claim 7, wherein by fixing the inverted crutches in the sheath, it allows the chair to remain fixed, preventing the patient from being able to move it at will, even removing the brakes; the crutches remain inoperative, and the front wheels of the chair stay off the ground, with the chair leaned on the rear wheels and crutches.

10. The wheelchair crutch assembly according to claim 1, wherein the limited movement of the wedge pivoting at the end of the shell contribute to stability when climbing stairs.

11. The wheelchair crutch assembly according to claim 10, wherein the height of the crutches are configured to be changed to facilitate adaptation to different situations.

* * * * *